Patented Oct. 14, 1924.

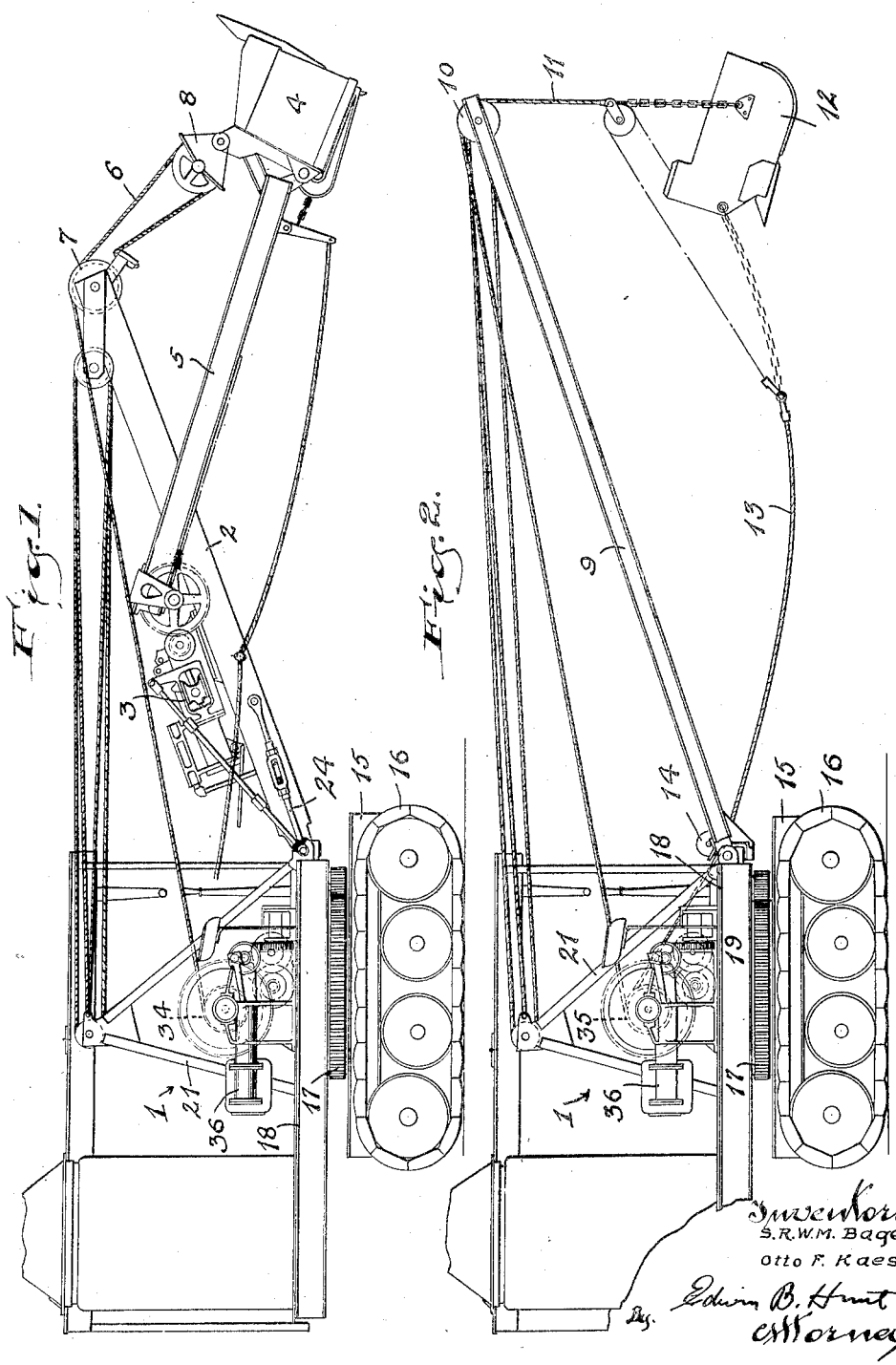

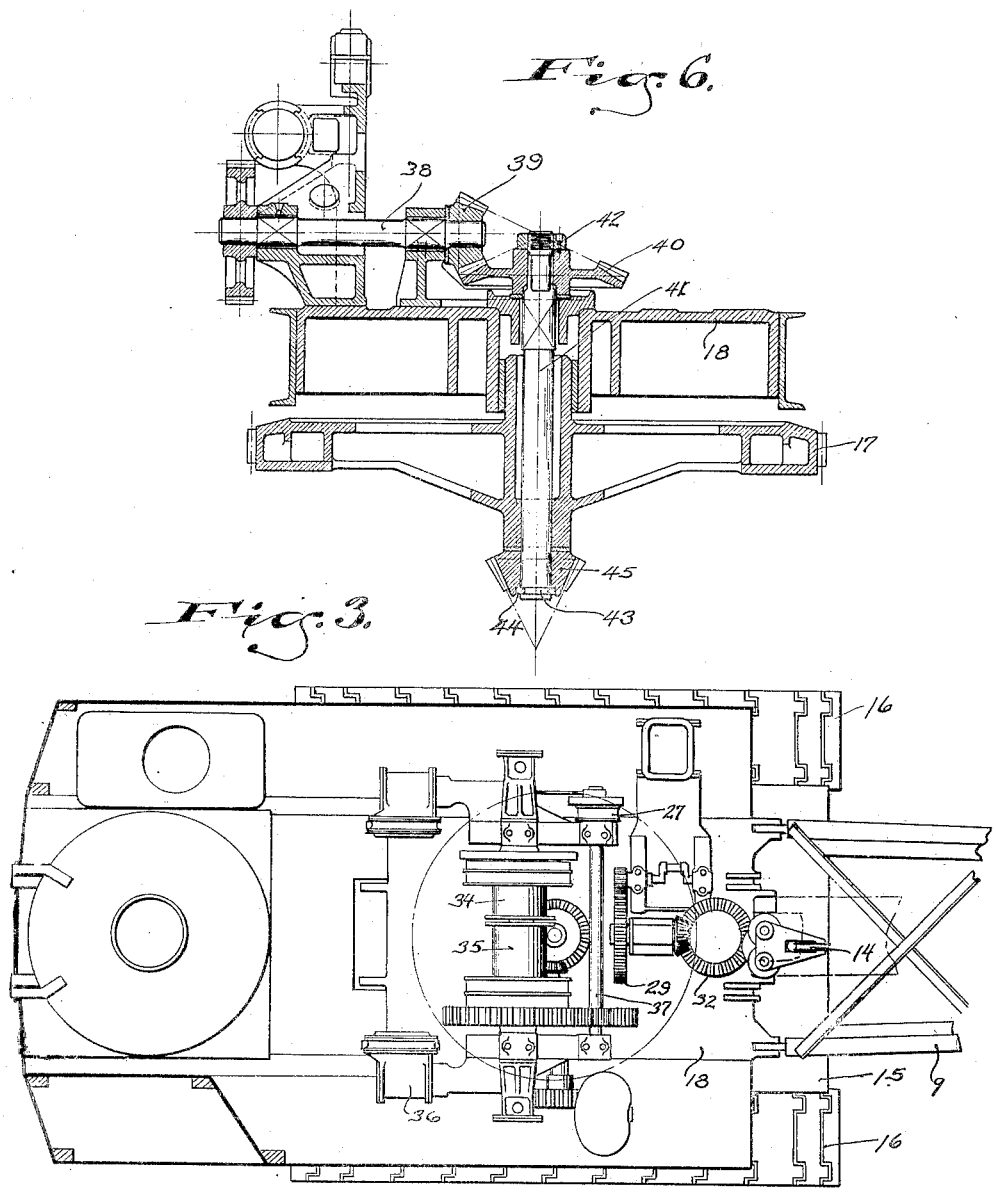

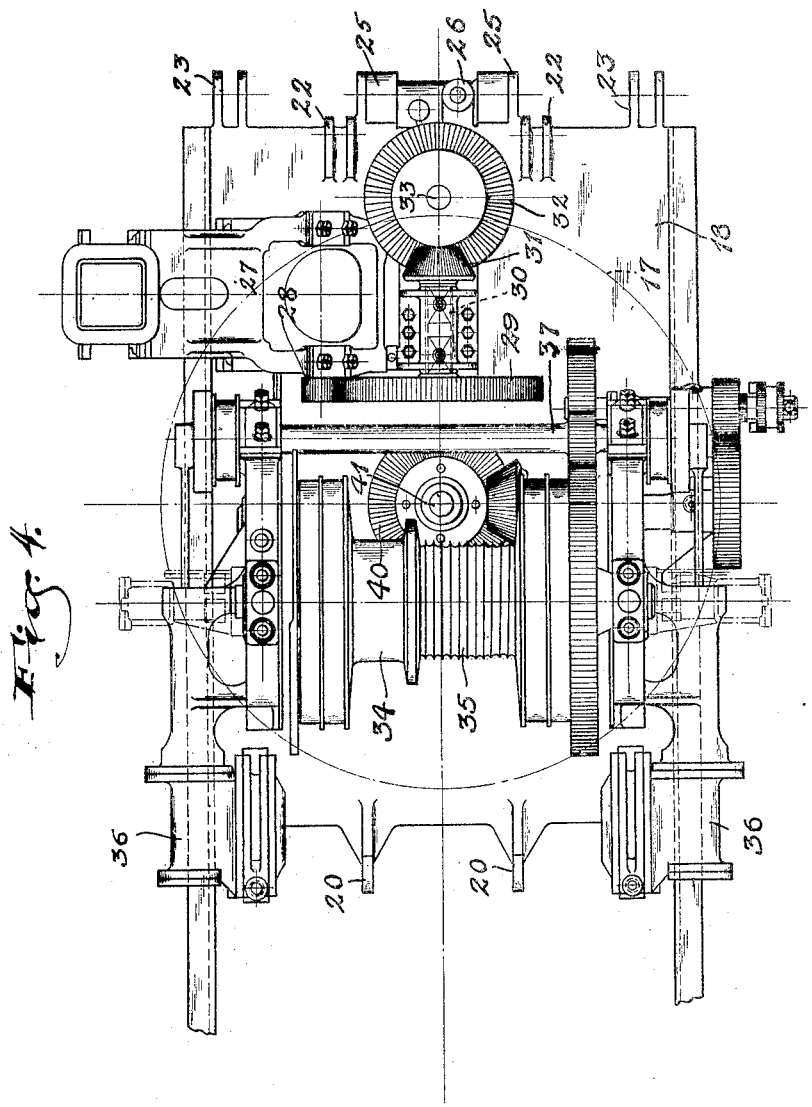

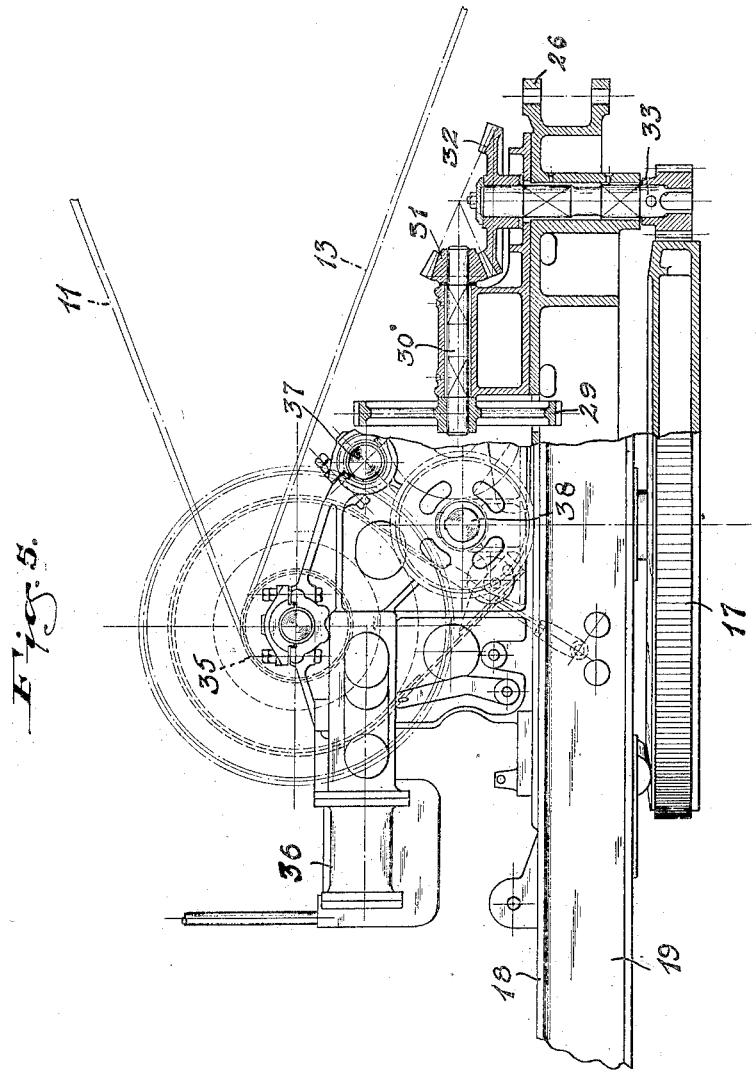

1,511,437

UNITED STATES PATENT OFFICE.

SVANTE R. W. M. BAGER, OF SOUTH MILWAUKEE, AND OTTO F. KAESER, OF MILWAUKEE, WISCONSIN, ASSIGNORS TO BUCYRUS COMPANY, OF SOUTH MILWAUKEE, WISCONSIN, A CORPORATION OF WISCONSIN.

EXCAVATING MACHINERY.

Application filed February 7, 1921. Serial No. 443,143.

*To all whom it may concern:*

Be it known that we, SVANTE R. W. M. BAGER and OTTO F. KAESER, both citizens of the United States, and residents of South Milwaukee, in the county of Milwaukee and State of Wisconsin, and of Milwaukee, in the county of Milwaukee and State of Wisconsin, respectively, have invented certain new and useful Improvements in Excavating Machinery; and we do hereby declare that the following is a full, clear, and exact description thereof.

Our invention relates to new and useful improvements in excavating machinery and has for its principal object to provide a machine which can be selectively converted into a drag line excavator or a dipper excavator.

Standard forms of both drag line excavators and dipper shovel excavators have been in general use for a considerable length of time, but heretofore it has been impractical to provide one machine which could be used for drag line purposes as well as for dipper shovel work, this difficulty arising as a result of the fact that the power required in the two classes of machines is considerably different. For instance the hoisting or main engine of a standard dipper excavator whose hoisting cable is reeved three part would not be capable of producing sufficient power to operate the drag cable of a drag line excavator as well as the hoisting cable thereof. We have discovered, however, that an excavator equipped as a dipper shovel machine with its hoisting cable reeved two part will very effectively operate drag line equipment whose hoisting and drag cables are reeved single part when the same is substituted for the dipper shovel equipment.

A further important object of this invention is to provide an excavator convertible from a drag line machine to a dipper shovel machine or vice versa and having a pair of cable drums disposed on the same axis and operable by the same source of power, both drums being used with drag line equipment, and either one of the drums alone being used with the dipper shovel equipment.

Another important object of the invention is to provide an excavating machine with two cable drums for use in drag line work, which drums are mounted on the same axis and located to the rear of the usual center of rotation of the movable machinery bed of the excavator and positioned at such a height above said bed as to permit the forwardly disposed machinery for swinging or turning said bed to be clear of that portion of the drag cable which extends from the fairlead to the drag cable drum. This machinery for rotating said bed is preferably relatively close to the latter.

It is also an object of this invention to provide a bed plate for an excavating machine which can be rotatably supported in a conventional manner and which is cast as a single unit with the boom, A-frame and fairlead attaching lugs as an integral part thereof.

Ordinarily in excavating machinery, it is relatively difficult to quickly and easily assemble or disassemble the rotatable machinery bed and the supporting frame on which it is mounted, the usual connection between these parts being a vertical driven shaft for transmitting power from the machinery on said bed to the propulsion means of the supporting frame. Therefore it is an object of this invention to provide a vertical power shaft which can be readily lifted from normal position on the removal of the gears on the opposite ends thereof.

With these general objects in view the invention resides in the novel features of construction, combination and arrangement of parts which will be hereinafter more particularly described and claimed and shown in the accompanying drawings wherein—

Figure 1 represents a semi-diagrammatic side elevational view of a dipper shovel excavator;

Figure 2 is a similar view of a drag line excavator, the main operating parts being the same as shown in Figure 1;

Figure 3 is a general plan view of the operating parts of an excavator which can be selectively used as a dipper shovel machine or as a drag line machine, many parts being omitted in this view for convenience in illustrating;

Figure 4 is a plan view of the machinery bed plate of an excavator constructed in accordance with our invention and provided with machinery for rotating the same, for operating drag and hoisting drums, and for propelling the complete machine;

Figure 5 is a side elevational view, partly in section, of the parts shown in Figure 4, and Figure 6 is a vertical transverse sectional view taken centrally through the vertical power shaft of the propelling machinery and showing particularly the manner of assembling said shaft and its gears.

Referring more particularly to the drawings, and especially Figures 1 and 2, it will be seen that the operating portion 1 of an excavating machine constructed in accordance with our invention may be equipped as a dipper shovel excavator, or as a drag line excavator. In other words this operating structure may have a dipper shovel boom 2 mounted at the forward edge of its machinery supporting bed which in turn carries a boom engine 3 and supports a shovel 4 by means of its handles 5 and a hoisting cable 6. It will be noted that the hoisting cable is trained over a pulley 7 on the end of the boom 2, and with respect to the shovel 4 is reeved two part. The padlock 8 around which this cable 6 is disposed is so pivoted to the shovel that it will oscillate only in one plane, and consequently will not fall over sideways when the cable is slack.

On the other hand said operating structure 1 when equipped as a drag line excavator is provided with a drag line boom 9, as shown in Figure 2, the same being secured at one end to the forward edge of the machinery bed and carries a pulley 10 on its outer end. A hoisting cable 11 is trained over this pulley 10 and extends to the hoisting drum of the operating structure which will be hereinafter more particularly described. A drag line bucket 12 is connected with the end of the cable 11 which is reeved single part with respect thereto, and said bucket also has a drag cable 13 connected thereto. This cable extends rearwardly through a fairlead 14 and to a drag cable drum forming part of the operating mechanism 1.

This operating mechanism includes a supporting frame 15 mounted on suitable traction mechanism as the caterpillars 16 and having a rack and track member 17. Disposed on this track and adapted to swing with respect thereto is a machinery supporting bed in the form of a one-piece cast metallic plate 18, the same having a pair of longitudinally extending side sills 19 and a plurality of attaching lugs, all of which are formed integrally therewith.

For instance extending from the rear end of the plate is a pair of spaced lugs 20 for the lower ends of the rear bars of the A-frame 21, the lower ends of the forward bars thereof being secured to lugs 22 occupying the same relative position at the front edge of the plate 18. The forward edge of the plate has a pair of more widely spaced attaching members in the form of lugs 23 by which the side bars of the drag line boom 9 may be attached to the plate 18, or whereby dipper shovel boom braces 24 may be attached. The end of the dipper shovel boom 2 is mounted between other lugs 25 likewise disposed at the forward end of the plate 18. Although not used when this boom 2 is attached, a bearing lug 26 is provided adjacent the lugs 25 for attaching the fairlead 14, the same being employed with the drag line equipment. As a result of this construction of the machinery supporting bed, it is obvious that a very strong base is provided and one which can be selectively used with either drag line or dipper shovel equipment.

Mounted on the plate 18 is a swing engine 27, the power of which is transmitted by a pinion 28 and a gear 29 to a longitudinally extending horizontally disposed shaft 30. As shown in Figure 5, this shaft is positioned relatively close to the plate 18 and the gear 29 operates through an opening in the latter so that this mechanism which is used for rotating the machinery supporting plate 18 on its track 17, will be relatively low or close to the surface of this plate. The other gears 31 and 32 which connect the shaft 30 with a vertical shaft 33 are also adjacent the bed surface, and thus all of these parts will be disposed out of the way of the drag cable 13 as the same extends between its fairlead 14 and its drum to be later more particularly referred to. As shown in Figure 5 the vertical shaft 33 is gear connected with the rack of the rack and track member 17 for swinging the plate 18 and the mechanisms mounted thereon.

The last mentioned swing or machinery bed revolving mechanism is located forwardly of the center of rotation of the bed 18, while the hoisting and drag line drums hereinbefore referred to, and most of the mechanism for operating the same are located rearwardly of this center of rotation whereby to equally distribute the weight and the forces exerted during the operation of the machine. These drums designated by the reference characters 34 and 35 are disposed end to end on the same shaft and are operable simultaneously or independently from the same source of power. The axis of this shaft on which the drums are disposed is mounted in bearings spaced a relatively considerable distance above the surface of the bed 18, such location being of importance when considered in connection with the location of the hereinbefore referred to swing machinery so that the drag cable will clear the latter. The drums are revolved by a pair of main engines 36, both of which are connected with a counter-shaft 37. Suitable mechanism, which is unimportant in so far as the present invention is concerned, is utilized for selectively transmitting the power from the shaft 37 to the drums.

If an excavating machine as it leaves the factory is to be used solely as a dipper shovel excavator, only a single drum, for instance the drum 35, is disposed on its shaft, the other drum and its operating mechanism being unnecessary as a hoisting cable 6 alone is used in dipper shovel work. However, if the owner of the machine at any time desires to convert his dipper shovel excavator into a drag line excavator, he has only to change the booms and parts carried thereby and add a second drum on the shaft which is already a part of the main operating mechanism 1. When this drum 34 is added, it becomes the hoisting drum and the drum 35 the drag cable drum. The change from one type of excavator to another is thus a comparatively simple operation, and the power of the engines 36 will be adequate to operate the drums for either type, provided however that in dipper shovel work the hoisting cable is reeved two part, and in drag line work the hoisting cable is single part.

Inasmuch as the engines 36 are not needed for operating the drums when the excavator is to be moved from place to place, the power of these engines is utilized for the traction mechanism, for instance the caterpillars 16. For this purpose the shaft 37 is suitably clutch and gear connected to a transversely disposed horizontal shaft 38 which is journaled in bearings on the machinery bed plate 18 and has a bevel pinion 39 on its inner end, this bevel pinion being meshed with a bevel gear 40 keyed or otherwise fixed to the upper end of a bevel shaft 41 which is located centrally of the rack and track member and is journaled in bearings carried thereby and by the machinery bed plate 18. It will be seen from Figure 4 that the supporting shaft of the drums 34 and 35 and the shaft 37 are located on opposite sides of the axis of the shaft 41 so that the latter will clear these and other parts when raised vertically.

The gear 40 is retained against longitudinal shifting on the shaft 41 by a nut 42 threaded on the upper end of the latter, the lower end thereof having an annular groove 43 in which a split ring or collar 44 is adapted to be disposed. This lower end portion of the shaft 41 is also adapted to have a bevel pinion 45 mounted thereon, the lower face of the same being socketed for the reception of the split ring 44. In other words the pinion 45 is held in position on the shaft 41 by this simple arrangement of the split collar, thus rendering disassembling very easy. In other words when the machinery supporting bed plate 18 is to be separated from its supporting frame, or if for any other purpose the shaft 41 is to be removed, the nut 42, which holds this shaft in normal operative position, is removed, whereupon said shaft 41 can be lowered slightly or sufficiently to permit the pinion 45 to be taken off and the gear 40 to be slid out of position and engagement with the pinion 39. This having been accomplished the shaft can be raised upwardly until it is entirely out of its bearings. The assembling of these parts is as simple as the disassembling, the operations merely being reversed.

From the foregoing description taken in connection with the accompanying drawings, it will be obvious that many changes may be made in the form and proportions of the different parts of the invention and in the manner of assembling the same without departing from the principal features thereof as outlined in the appended claims.

We claim:

1. In an excavating machine, a relatively stationary turntable track, a vertical shaft journaled centrally of said track, traction means supporting the track and connected with the vertical shaft, a revoluble machinery supporting bed mounted on the track and having the vertical shaft extended therethrough, means carried by the bed and engaged with the track for revolving the former, said means being disposed forwardly of said vertical shaft, means carried by the bed and connected with the shaft for operating the traction means, excavating means carried by the bed, and a cable drum mounted on the bed rearwardly of the vertical shaft and out of alignment therewith, said shaft being movable vertically upwardly out of its bearings to separate the bed and track.

2. In a machine of the class described, the combination of a frame adapted to be traction supported, a swinging machinery-carrying bed on the frame, a vertical drive shaft journaled in the frame and bed and adapted to be connected with the traction means supporting the frame, a gear mounted on the upper end of the shaft from which the same is driven, a second gear on the lower end of the shaft, a retaining element on the upper end of the shaft for holding the same in normal operative position and for securing the gears thereto, said shaft being adapted to be lowered through its bearings when the retaining element is removed to permit removal of the gears from the shaft, said shaft being raised upwardly to separate the same from the frame and bed.

3. In a machine of the class described, the combination of a frame adapted to be traction supported, a swinging machinery-carrying bed on the frame, a vertical drive shaft journaled in the frame and bed and adapted to be connected with the traction means supporting the frame, the lower end of said shaft having an annular groove, a gear disposed on the lower end of the shaft and having a socket in its under side, a retaining ring disposed in said annular groove and seated in said socket, a retaining nut on the upper end of the shaft for holding the same in normal operative position, a second gear on the upper end of the shaft and held thereon by said nut, said gear being adapted to drive the shaft, the latter being adapted to be lowered through its bearings when the retaining nut is removed to permit removal of the gears therefrom, the shaft being raised upwardly to separate the same from the frame and bed.

4. As a new article of manufacture, an integral casting constituting a bed for supporting the operating parts of a power excavator, said bed having means at the forward end thereof for connection with the inner end of a boom, and two sets of lugs respectively disposed upon the forward and rear portions of said bed for connection with an A-frame and through which the outer end of the boom may be supported.

In testimony that we claim the foregoing we have hereunto set our hands, OTTO F. KAESER having subscribed at South Milwaukee, in the county of Milwaukee and State of Wisconsin, and SVANTE R. W. M. BAGER at Memphis, county of Shelby, State of Tenn.

OTTO F. KAESER.
SVANTE R. W. M. BAGER.